United States Patent [19]

Rixon et al.

[11] Patent Number: 5,697,260
[45] Date of Patent: *Dec. 16, 1997

[54] ELECTRONIC ADJUSTABLE PEDAL ASSEMBLY

[75] Inventors: Christopher J. Rixon, Tecumseh, Canada; Christopher Bortolon, Clawson, Mich.

[73] Assignee: Teleflex Incorporated, Plymouth Meeting, Pa.

[*] Notice: The term of this patent shall not extend beyond the expiration date of Pat. No. 5,632,183.

[21] Appl. No.: 741,981

[22] Filed: Oct. 31, 1996

Related U.S. Application Data

[63] Continuation-in-part of Ser. No. 516,050, Aug. 17, 1995, which is a continuation-in-part of Ser. No. 513,017, Aug. 9, 1995, Pat. No. 5,632,183.

[51] Int. Cl.⁶ ........................................ G05G 1/14
[52] U.S. Cl. .............................. 74/514; 74/513; 74/560
[58] Field of Search ............................ 74/512, 513, 514, 74/560

[56] References Cited

U.S. PATENT DOCUMENTS

| | | | |
|---|---|---|---|
| 3,151,499 | 10/1964 | Roe | 74/560 |
| 3,319,487 | 5/1967 | Lystad et al. | 74/560 |
| 3,359,821 | 12/1967 | Beardsley et al. | 74/478 |
| 3,643,525 | 2/1972 | Gibas | 74/512 |
| 3,958,677 | 5/1976 | Spanelis | 74/513 |
| 4,582,653 | 4/1986 | Blanchard et al. | 261/65 |
| 4,640,248 | 2/1987 | Stoltman | 423/399 |
| 4,869,220 | 9/1989 | Imoehl | 123/399 |
| 4,870,871 | 10/1989 | Ivan | 74/513 |
| 4,875,385 | 10/1989 | Sitrin | 74/512 |
| 4,905,544 | 3/1990 | Ganoung | 74/858 |
| 4,912,997 | 4/1990 | Malcolm et al. | 74/335 |
| 4,915,075 | 4/1990 | Brown | 123/399 |
| 4,944,269 | 7/1990 | Imoehl | 123/399 |
| 4,958,607 | 9/1990 | Lundberg | 123/399 |
| 4,989,474 | 2/1991 | Cicotte et al. | 74/512 |
| 5,010,782 | 4/1991 | Asano et al. | 74/512 |
| 5,045,035 | 9/1991 | Ganoung | 475/42 |
| 5,078,024 | 1/1992 | Cicotte et al. | 74/512 |
| 5,233,882 | 8/1993 | Byram et al. | 74/514 |
| 5,335,563 | 8/1994 | Yamamoto et al. | 74/512 |
| 5,408,899 | 4/1995 | Stewart | 74/513 |
| 5,460,061 | 10/1995 | Redding et al. | 74/512 |

FOREIGN PATENT DOCUMENTS 4128519  4/1992  Japan.

*Primary Examiner*—Charles A. Marmor
*Assistant Examiner*—Mary Ann Battista
*Attorney, Agent, or Firm*—Howard & Howard

[57] ABSTRACT

An electronic adjustable control pedal assembly for a motor vehicle including a carrier, a guide rod adapted to be secured to the dash panel of the vehicle and mounting the carrier for fore and aft movement along the guide rod, a power drive operative to move the carrier along the guide rod, a pedal arm pivotally mounted on the carrier, a potentiometer mounted on the carrier and operative to generate an output electrical signal proportioned to the extent of pivotal movement of the pedal arm, and a resistance assembly to provide feedback or "feel" to the operator. The resistance assembly includes an annular friction surface defined on the carrier, a sleeve positioned over the friction surface, and a coil spring encircling the sleeve and arranged to be tightened in response to pivotal movement of the pedal arm to squeeze the sleeve against the friction surface and generate a friction resistance force. The friction resistance force adds to the torsional resistance force of the spring during application of the pedal and subtracts from the torsional resistance force of the spring upon release of the pedal, whereby to create a hysteresis effect.

15 Claims, 5 Drawing Sheets

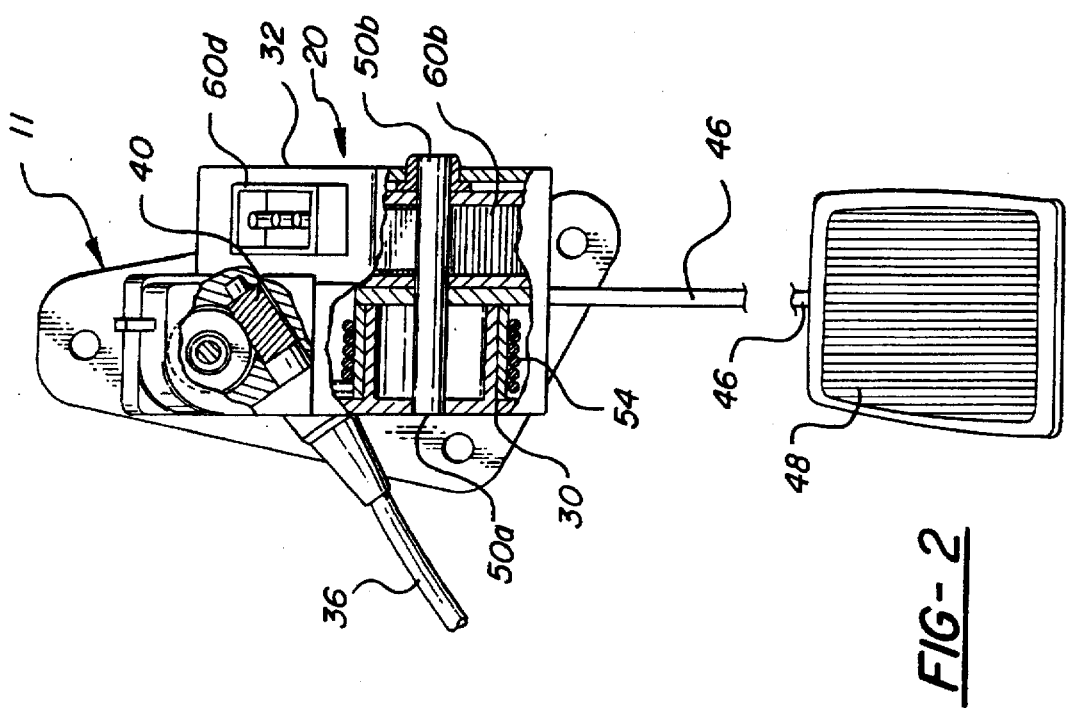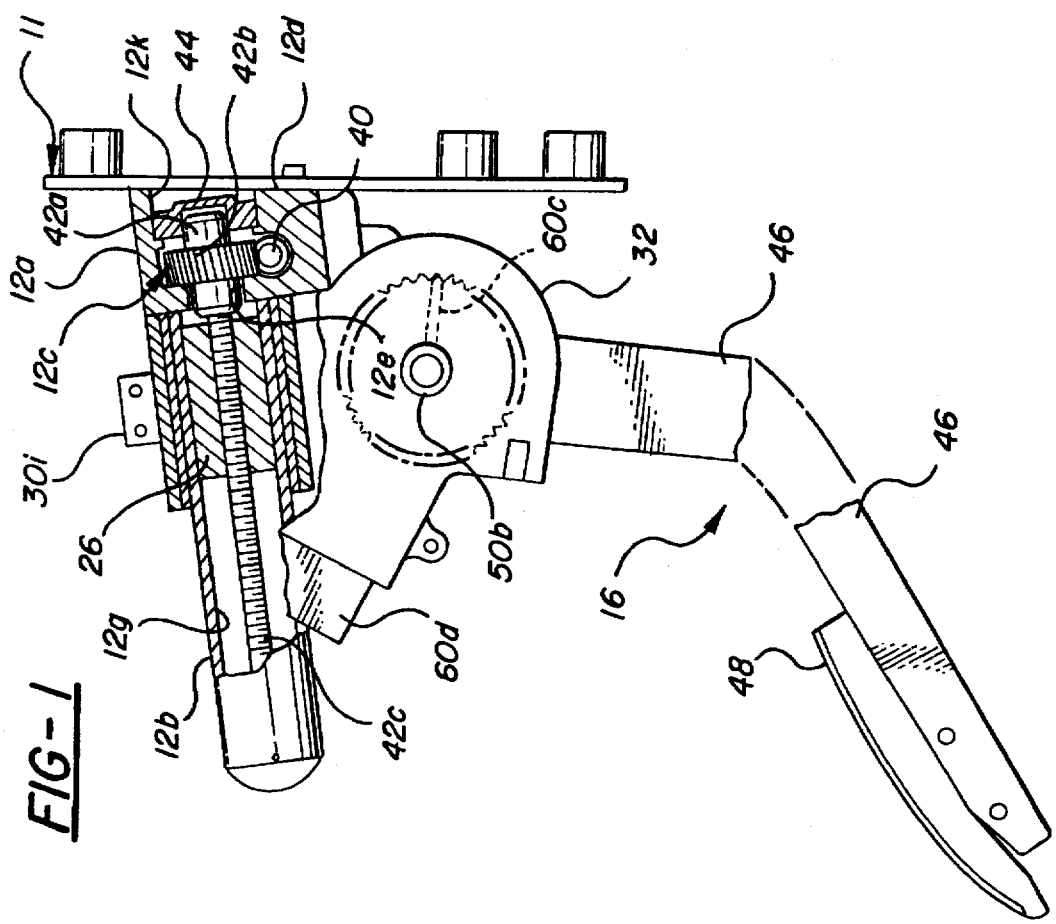

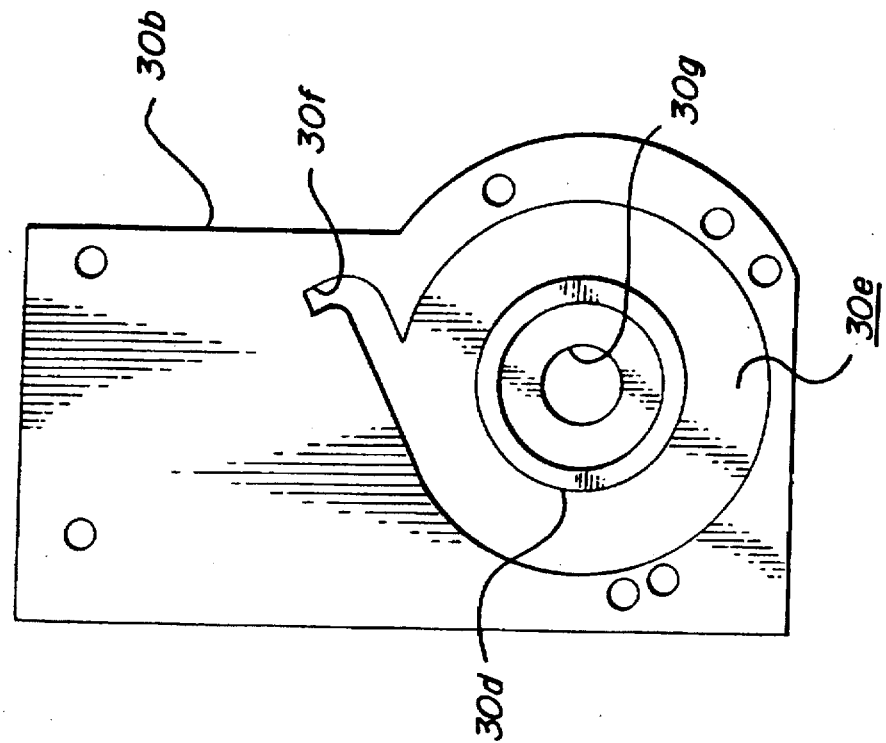
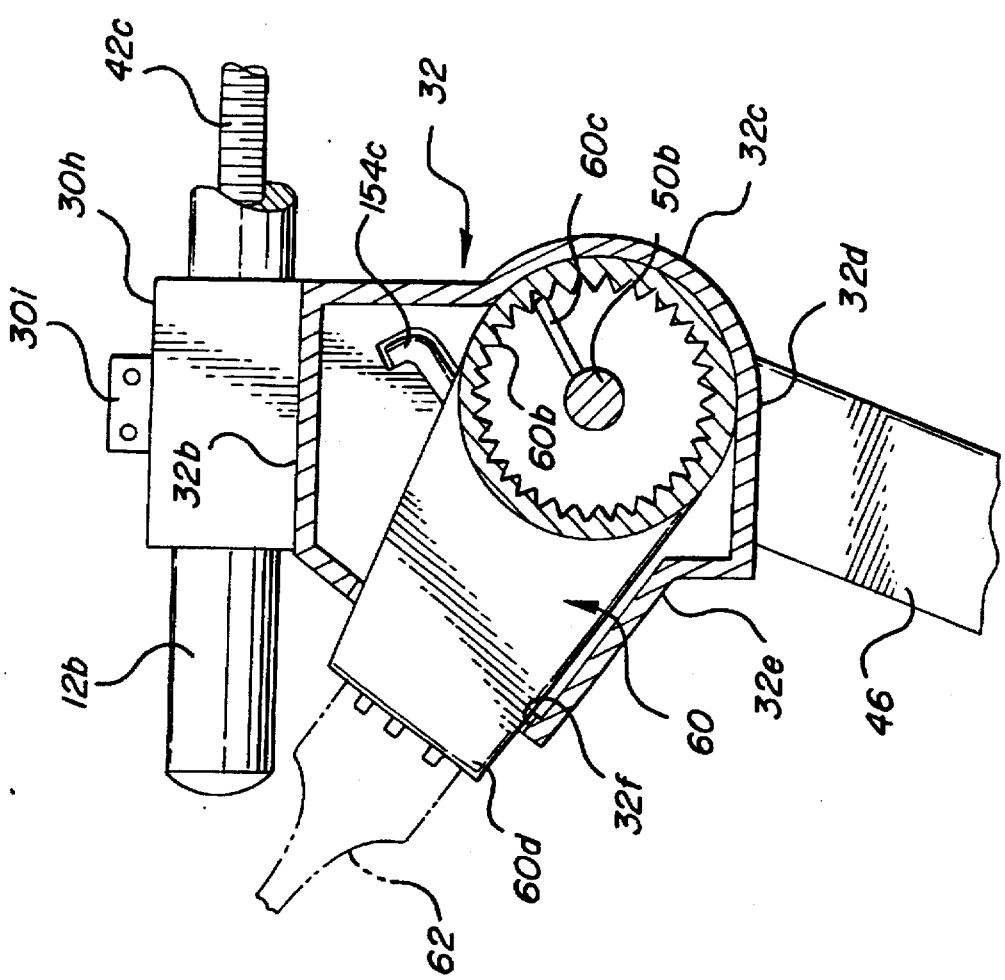

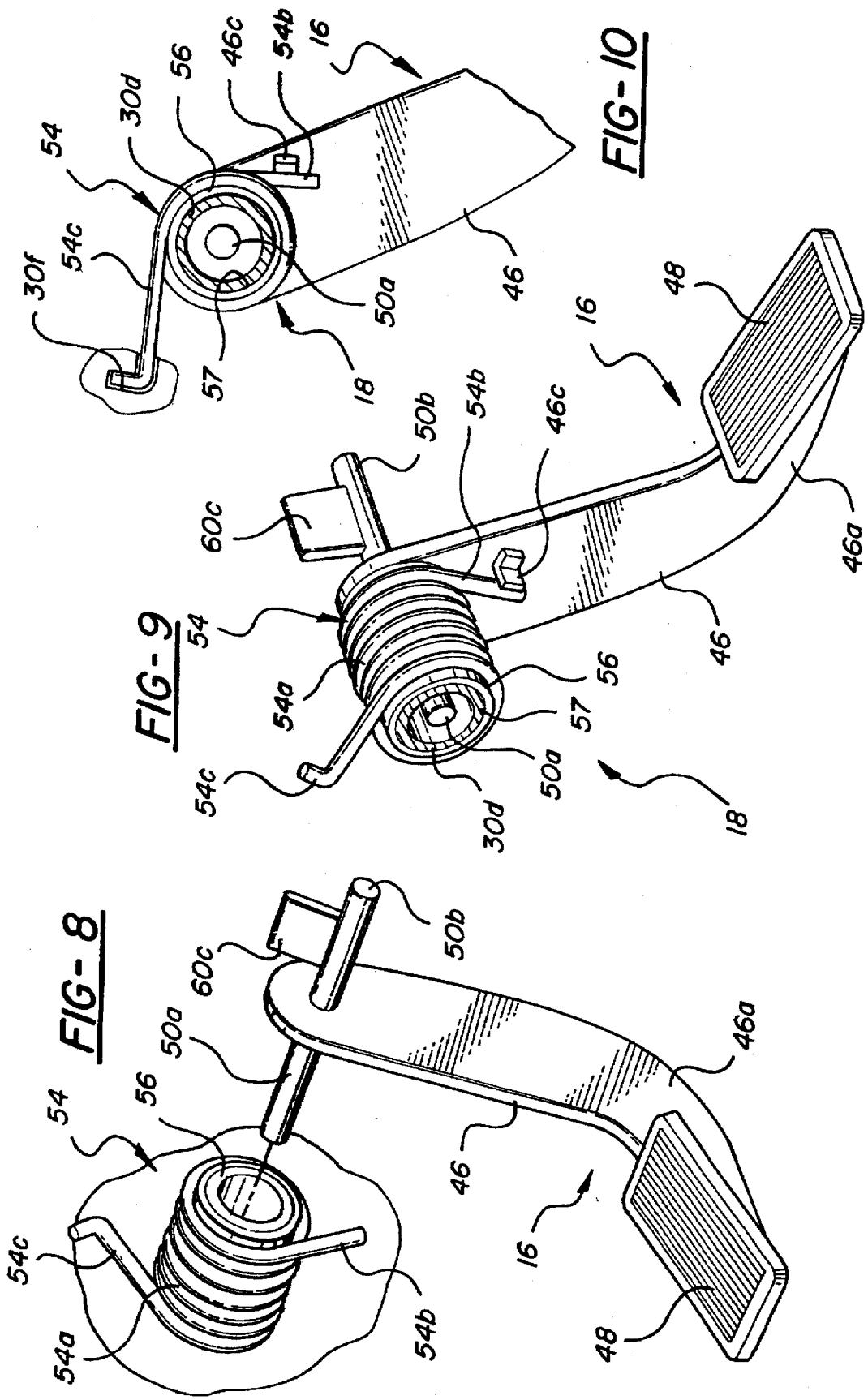

ELECTRONIC ADJUSTABLE PEDAL ASSEMBLY

RELATED APPLICATION

This application is a continuation-in-part of U.S. patent application Ser. No. 08/516,050 filed on Aug. 17, 1995 and entitled Electronic Adjustable Pedal Assembly which is a continuation-in-part of U.S. patent application Ser. No. 08/513,017 filed on Aug. 9, 1995, now U.S. Pat. No. 5,632,183 and entitled Adjustable Pedal Assembly.

BACKGROUND OF THE INVENTION

This invention relates to control pedal apparatuses and more particularly to adjustment means for selectively adjusting the position of one or more of the control pedals of a motor vehicle.

In a conventional automotive vehicle pedals are provided for controlling brakes and engine throttle. If the vehicle has a manual transmission a clutch pedal is also provided. These pedals are foot operated by the driver. In order for the driver to maintain the most advantageous position for working these control pedals the vehicle front seat is usually slidably mounted on a seat track with means for securing the seat along the track in a plurality of adjustment positions.

The adjustment provided by moving the seat along the seat track does not accommodate all vehicle operators due to differences in anatomical dimensions. Further, there is growing concern that the use of seat tracks, and especially long seat tracks, constitutes a safety hazard in that the seat may pull loose from the track during an accident with resultant injuries to the driver and/or passengers. Further, the use of seat tracks to adjust the seat position has the effect of positioning shorter operators extremely close to the steering wheel where they are susceptible in an accident to injury from the steering wheel or from an exploding air bag. It is therefore desirable to either eliminate the seat track entirely or shorten the seat track to an extent that it will be strong enough to retain the seat during an impact. Shortening or eliminating the seat track requires that means be provided to selectively move the various control pedals to accommodate various size drivers.

Various proposals were made over a period of many years to provide selective adjustment of the pedal positions to accommodate various size drivers but none of these proposals met with any significant commercial acceptance since the proposed mechanisms were unduly complex and expensive and/or were extremely difficult to operate and/or accomplished the required pedal adjustment only at the expense of altering other critical dimensional relationships as between the driver and the various pedals. Recently a control pedal mechanism has been developed which is simple and inexpensive and easy to operate and that accomplishes the required pedal adjustment without altering further critical dimensional relationships as between the driver and the various pedals. This control pedal mechanism is disclosed in U.S. Pat. Nos. 4,875,385; 4,989,474 and 5,078,024 all assigned to the assignee of the present application. The present invention represents further improvements in adjustable control pedal design and specifically relates to an adjustable control pedal apparatus which is compatible with, and incorporates, a drive-by-wire arrangement in which the link between the pedal and the associated controlled device of the motor vehicle comprises an electronic signal rather than a mechanical linkage.

SUMMARY OF THE INVENTION

This invention is directed to the provision of a simple, inexpensive and effective apparatus for adjusting the control pedals of a motor vehicle.

More specifically, this invention is directed to the provision of an adjustable control pedal apparatus that is especially suitable for use in conjunction with a drive-by-wire throttle control.

The invention apparatus is adapted to be mounted on the body structure of the motor vehicle and includes a carrier, guide means mounting the carrier for fore and aft movement relative to the body structure, drive means operative to move the carrier along the guide means, and generator means operative in response to movement of the pedal structure relative to the carrier to generate an electric control signal proportioned to the extent of movement of the pedal relative to the carrier.

According to the invention, the pedal assembly further includes a coil spring arranged to be torsionally tightened in response to a force applied to the pedal pad, whereby to provide a spring resistance force opposing the pedal apply force, and arranged to be torsionally relaxed in response to release of the pedal apply force, whereby to provide a spring return force, and the pedal assembly further includes means operative in response to torsional tightening of the spring to generate a frictional resistance force that is additive with respect to the spring resistance force and subtractive with respect to the spring return force. This arrangement provides an effective means of providing the desired feel or feedback to the operator upon movement of the pedal and further provides the desired hysteresis effect.

According to a further feature of the invention, the operative means includes an annular sleeve mounted on an annular friction surface and the coil spring closely encircles the sleeve so that the torsional tightening of the spring urges the sleeve into frictional engagement with the friction surface. This specific sleeve and spring construction provides a simple and effective means of providing desired hysteresis effect.

According to a further feature of the invention, the pedal structure includes a pedal arm carrying the pedal pad at the lower end of the pedal arm and a pivot shaft at the upper end of the pedal arm mounting the pedal arm for pivotal movement on the carrier; the carrier includes a housing defining a hub structure defining the annular friction surface; the pivot shaft is journaled in the housing and is positioned concentrically within the hub structure; the sleeve is positioned over the hub structure; and the coil spring winds around the sleeve with one end of the spring anchored to the pedal arm and the other end of the spring anchored to the housing. This specific construction provides a compact package suitable for use in the close confines of the area beneath the instrument panel of a motor vehicle.

According to a further feature of the invention, the generator means comprises a potentiometer whose setting is varied in response to rotary movement of the pivot shaft of the pedal structure. The use of the pivot shaft of the pedal structure as an input shaft for the potentiometer further simplifies and compacts the pedal assembly structure.

In the disclosed embodiment of the invention, the pivot shaft includes a first end portion at one side of the pedal arm and a second end portion at another side of the pedal arm; the first end portion of the pivot shaft is positioned within the housing hub structure; and the second end portion of the pivot shaft comprises an input shaft for the potentiometer.

According to a further feature of the invention, the guide means comprises a guide rod; the carrier includes an upper portion mounted on the guide rod for sliding fore and aft movement along the guide rod; and the pedal structure includes a pedal arm having an upper end mounted on a lower portion of the carrier. This specific guide rod/carrier construction provides a simple and efficient means of providing the desired fore and aft movement of the carrier along the guide rod.

According to a further feature of the invention the guide rod comprises a hollow rod; the carrier further includes a nut slidably positioned within the hollow of the guide rod and means connecting the nut to the carrier so that sliding movement of the nut within the guide rod moves the carrier fore and aft along the guide rod; and the drive means includes a screw shaft threadably received in the nut and means operative to rotate the screw shaft. This specific construction provides an effective drive means for the carrier.

BRIEF DESCRIPTION OF THE DRAWING

FIG. 1 is a side elevational view of an accelerator pedal assembly according to the invention;

FIG. 2 is a rear view of the accelerator pedal assembly;

FIGS. 5 and 6 are cross-sectional views of the accelerator pedal assembly;

FIG. 7 is a detail view of a section of a housing employed in the accelerator pedal assembly; and FIGS. 8, 9 and 10 are schematic views illustrating the manner in which the invention accelerator pedal assembly operates to generate a hysteresis effect.

DETAILED DESCRIPTION OF THE PREFERRED EMBODIMENT

Figure 3:
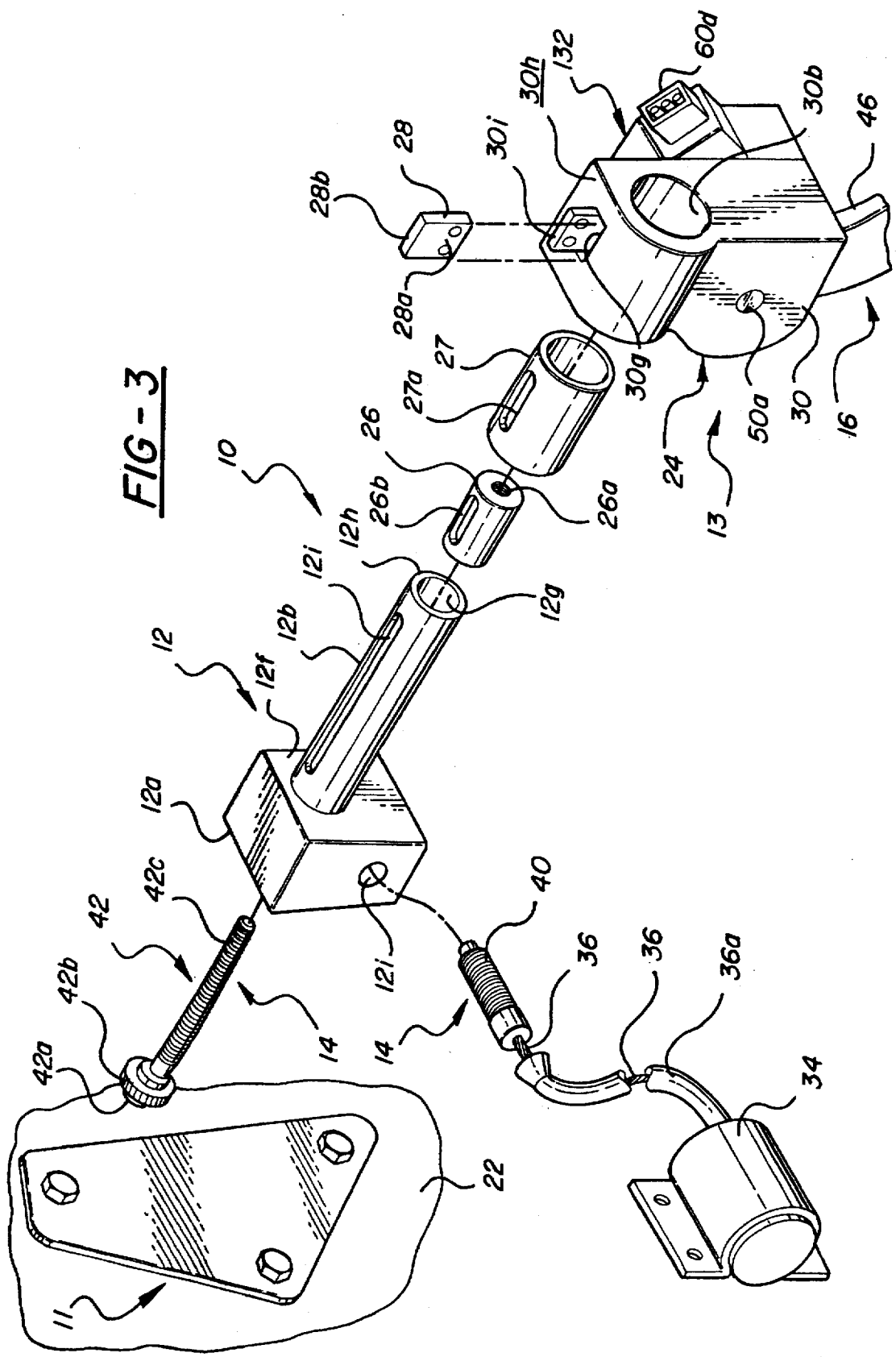
FIG. 3 is a partially exploded view of the accelerator pedal assembly.
Figure 5:
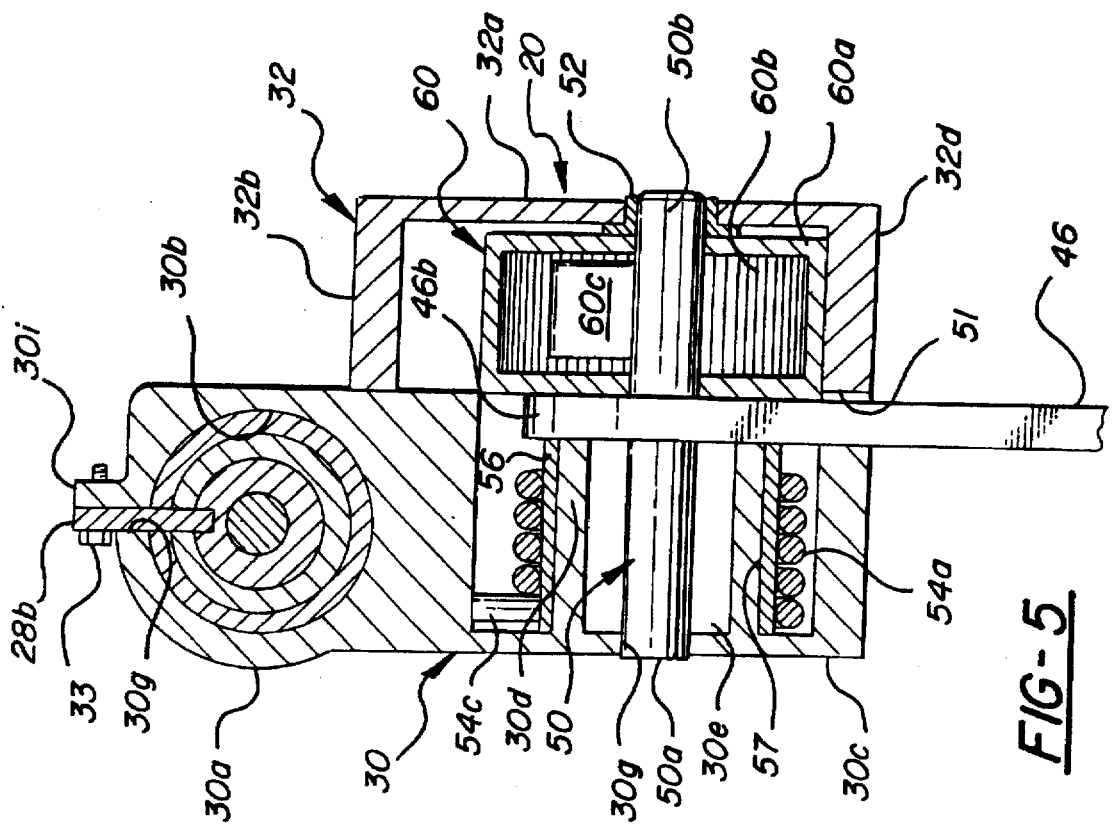
Figure 4:
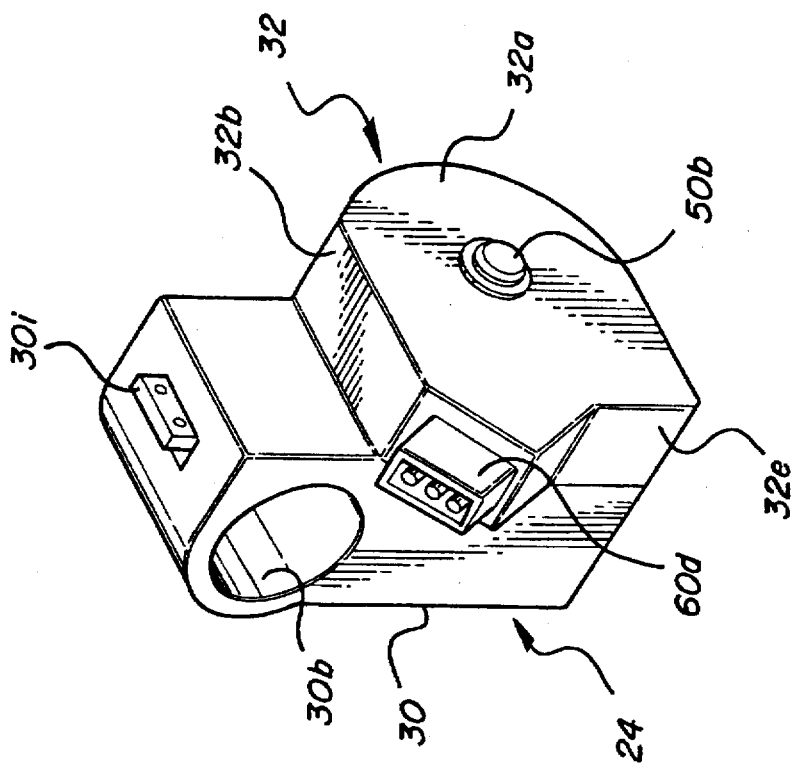
FIG. 4 is a perspective view of a sub assembly of the accelerator pedal assembly.

The invention accelerator pedal assembly 10, broadly considered, is intended to allow efficient fore and aft movement of the pedal assembly to accommodate operators of varying anatomical dimension and is operative to generate an electronic or drive-by-wire signal in response to pivotal movement of the pedal assembly while retaining the same ergometric operation of the pedal irrespective of the position of adjustment of the pedal.

Pedal assembly 10 includes a mounting bracket 11, a guide structure 12, a carrier assembly 13, a drive assembly 14, a pedal assembly 16, a resistance assembly 18, and a generator means 20.

Mounting bracket 11 is adapted to be suitably secured to the dash panel 22 of the associated motor vehicle, utilizing suitable fastener means, in known manner.

Guide structure 12 includes a transmission housing portion 12a and a guide rod portion 12b. Transmission housing portion 12a is suitably secured to and extends rearwardly from bracket 11 and has a generally cubicle configuration defining an axial bore 12d opening at the front face 12d of the housing portion and further defining a central bore 12e in a rear wall 12f of the housing portion concentric with bore 12c.

Guide rod portion 12b extends rigidly rearwardly from the rear wall 12f of the transmission housing portion, is hollow so as to provide a tubular configuration defining a central circular axial bore 129 concentric with bores 12c and 12e, is open at its rear end 12h, and includes an upper axial slot 12i extending from a location proximate the transmission housing wall 12f to a location proximate guide rod rear end 12h.

Carrier assembly 13 includes a housing 24, a nut 26, a bushing 27, and a key 28.

Housing 24 is designed to move slidably along the guide rod portion 12b of guide structure 12 and preferably is formed of left and right molded acetal plastic sections 30 and 32 which are suitably joined together along a vertical plane by the use of fasteners, heat sealing or other means.

Left housing section 30 includes an upper portion 30a defining a through axial bore 30b and a lower portion 30c defining an annular hub structure 30d and an annular spring chamber 30e in concentric surrounding relation to hub structure 30d and including a tail portion 30f.

Housing 24 is mounted on the guide rod portion 12b of guide structure 12 with bushing 27 positioned in bore 30b and guide rod portion 12b positioned slidably within bushing 27 so as to mount the housing for sliding movement along the guide rod.

Right housing section 32 is generally hollow and includes an outer side wall 32a, a top wall 32b, a front wall 32c, a bottom wall 32d, and an angled rear wall 32e defining an opening 32f.

Nut 26 is circular, preferably plastic, is mounted for sliding movement in circular bore 12g of guide rod 12b, and defines a central threaded bore 26a.

Key 28 is seated at its lower end 28a in a notch or pocket 26b in the upper periphery of nut 26 and passes upwardly through a slot 27a in bushing 27, through guide rod slot 12i, and through an opening 30g in the top wall 30h of left housing section 30 for securement at its upper end 28b, by fasteners 33, to a flange structure 30i upstanding from left housing section top wall 30h. Key 28 thus lockingly interconnects nut 26 and housing 24 so that movement of nut 26 in bore 12g is imparted to housing 24 so as to move housing 24 axially along guide rod portion 12b.

Drive assembly 14 includes a motor 34, a cable 36, a bracket 38, a worm 40, a worm gear 40, and an elongated drive member 42.

Motor 34 comprises a suitable electric motor, with position memory if required, and is suitably secured to dash panel 22 proximate bracket 11.

Cable 36 comprises a well-known Bowden cable and is drivingly secured at one end 36a to the output shaft of motor 34. The other end 36b of cable 36 is drivingly attached to worm gear 40.

Worm gear 40 is suitably journaled in an upwardly angled bore 12j in transmission housing 12a in angled underlying relation to bore 12c.

Drive member 42 includes a front journal portion 42a, a worm wheel 42b, and a rear screw shaft portion 42c. Drive member 42 is positioned within guide structure 12 with journal portion 42a journaled in a retainer 44 positioned in a counterbore 12k in the front end of transmission housing 12a, worm wheel 42b drivingly engaging worm gear 40, and screw shaft 42c extending rearwardly through bore 12e and centrally within guide rod structure 12b for threaded engagement with the threaded central bore 26a of nut 26. It will be seen that actuation of motor 34 has the effect of rotating screw shaft 42c to thereby move nut 26 and housing 24 fore and aft along guide rod 12b with the extent of forward and rearward movement defined and limited by engagement of key 28 with the front and rear ends of slot 12i.

Pedal assembly 16 includes a pedal arm 46, a pedal pad 48 secured to the lower end 46a of the pedal arm, and a pivot shaft 50. Pedal arm 46 passes upwardly through a slot 51 defined in housing 24 at the lower juncture of left and right housing sections 30 and 32. Pivot shaft 50 is fixedly secured to the upper end 46b of the pedal arm and includes a left portion 50a journaled in an aperture 30g in the outboard face of left housing section 30 concentrically within hub structure 30d and a right portion 50b journaled in side wall 32a of right housing section 32 utilizing a bushing 52.

Resistance assembly 18 includes the hub portion 30d of left housing section 30 and further includes a coil spring 54 and a sleeve 56. Resistance assembly 18 is intended to provide feedback or "feel" to the operator to replace the feedback normally provided by the mechanical linkage interconnecting the accelerator pedal and the fuel throttle. With a mechanical linkage, the pedal pressure required when advancing the accelerator pedal is greater than that required to maintain a fixed position. This difference is often referred to as due to the hysteresis effect. This effect is important in maintaining the accelerator pedal in position while driving at a relatively constant speed and it must also be considered in achieving a desired deceleration time. The pressure which must be applied in accelerating is easily borne but if the back pressure of an accelerator spring produced the same effect during the time it was required to retain or maintain speed it would soon become uncomfortable for the operator to maintain a relatively constant speed. The hysteresis effect provides relief. It lessens the load required to maintain a setting of the accelerator yet there is still force to cause reverse pedal action when the foot applied pressure is removed. Resistance assembly 18 provides the "feel" of a mechanical linkage including the desired hysteresis effect to relieve operator fatigue.

Sleeve 56 may be formed, for example, of a Delrin® plastic material and is positioned with a friction fit over hub structure 30d to define an annular plastic-to-plastic frictional interface 57.

Spring 54 comprises a helical spring and is preferably formed of a suitable ferrous material. Spring 54, in addition to the primary convolutions 54a, includes a pedal tail portion 50b and a housing tail portion 50c. Spring 54 is positioned in spring chamber 30e with the primary convolutions 54a in tight, surrounding relation to sleeve 56, pedal tail portion 54 engaging a tab 46c struck from pedal arm 46, and housing tail portion 54c positioned in the tail portion 30f of spring chamber 30e.

Generator means 20 comprises a potentiometer 60 positioned within the hollow of right housing section 32 and suitably secured to housing side wall 32a. Potentiometer 60 includes a central shaft, constituted by pivot shaft portion 50b, a housing 60a concentric with shaft portion 50b, a plurality of resistance elements 60b mounted circumferentially around the inner periphery of housing 60a in side-by-side relation, a wiper arm 60c mounted on shaft portion 50b and operative to electrically slidably engage the resistance elements 60b in response to pivotal movement of shaft 50, and an outlet 60d projecting rearwardly through opening 32f in right housing rear wall 32e and electrically connected to wiper 60c and resistance elements 60b in a manner such that the electrical signal appearing at the outlet 60d varies in proportion to the extent of pivotal movement of pivot shaft 50. It will be seen that pivotal movement of pedal assembly 16 has the effect of rotating pivot shaft portion 50b and thereby varying the electrical signal appearing at the potentiometer outlet 60d so that the signal appearing at outlet 60d is at all times proportioned to and indicative of the pivotal position of the pedal. It will be understood that electric power is suitably supplied to potentiometer 60 and an electrical conduit 62 is suitably connected to potentiometer outlet 60d and extends to the vehicle function or accessory, such as the vehicle throttle, that is being electrically controlled by the pedal assembly.

In operation, the position of pedal pad 48 relative to the operator is selectively adjusted by selectively energizing motor 34 to selectively move nut 26 forwardly and rearwardly within guide rod bore 12g and thereby, via key 28, move the pedal assembly selectively forwardly and rearwardly along guide rod 12b with the limit of forward and rearward movement determined by engagement of key 28 with the respective forward and rearward ends of slot 12i. In any position of adjustment of the pedal, actuation of the pedal or release of the pedal results, in the manner previously described, in the generation of an output signal at the outlet 60d proportioned to the extent of pivotal movement. Since the pivotal movement of the pedal arm is precisely the same in any position of adjustment of the pedal structure, the ergometrics of the assembly do not vary irrespective of the position of adjustment of the pedal assembly and irrespective of the anatomical stature of the operator.

As the pedal is moved downwardly, a "feel" is imparted to the pedal, simulating the feel of a mechanical linkage between the pedal and the controlled vehicle system, by the combined effect of torsioning of the coil spring 54 and frictional sliding or wiping engagement between sleeve 56 and hub structure 30d at frictional interface 57. That is, as force is applied to move the pedal downwardly, the feel imparted is additive and is equal to the combined torsional resistance of spring 54 and the frictional resistance generated at annular interface 57 between sleeve 56 and hub structure 30d. It will be seen that just as the torsional resistance provided by spring 54 increases in proportion to the extent of downwardly pivotal pedal movement, so also does the frictional resistance at interface 57 progressively increase due to the progressively greater squeezing force exerted on sleeve 56 by the progressively tightening spring 54. As the pedal is thereafter released or allowed to return under the impetus of spring 54, the gradually decreasing frictional force at interface 57 becomes subtractive rather than additive with respect to the gradually decreasing torsional spring force, thereby creating the desired hysteresis effect. The amount of feel imparted to the pedal can thus be precisely adjusted by adjusting the spring rate or other parameters of spring 54, and/or by adjusting the materials or other parameters of sleeve 56 and hub structure 20d, thereby rendering it relatively easy to fine tune the system to achieve any desired feel and any desired hysteresis effect.

The invention will be seen to provide an electronic adjustable pedal assembly for a motor vehicle in which the assembly may be readily adjusted to accommodate operators of varying anatomical dimensions, in which the ergometrics of the system remain constant irrespective of the position of adjustment of the pedal structure, and in which the desired hysteresis effect is provided in any position of adjustment of the pedal structure. Further, the invention pedal assembly provides the desired adjustability, the desired ergometrics, and the desired hysteresis effect in a structure that is simple, inexpensive, and positive and reliable in operation.

Whereas a preferred embodiment of the invention has been illustrated and described in detail, it will be apparent that various changes may be made in the disclosed embodiment without departing from the scope or spirit of the invention. For example, although the invention pedal assembly has been indicated for use in controlling the throttle of the associated vehicle, the invention pedal assembly may be used to electrically control a wide variety of vehicle functions or accessories. Further, although the resistance assembly 18 has been illustrated as providing the damping for an adjustable pedal assembly, it will be apparent that this resistance assembly can also be utilized to provide damping for a non-adjustable pedal assembly.

We claim:

1. An adjustable drive-by-wire pedal assembly for a motor vehicle adapted to be mounted on a body structure of the vehicle and operative to generate an electric control signal for controlling an associated device of the motor vehicle, said assembly comprising:

a carrier;

guide means mounting the carrier for fore and aft movement relative to the vehicle body structure;

drive means for moving the carrier along the guide means;

a pedal structure mounted on the carrier for movement relative to the carrier and including a pedal pad;

generator means operative in response to movement of the pedal structure relative to the carrier to generate an electric control signal that varies in magnitude in proportion to the extent of movement of the pedal structure relative to the carrier so that the control signal is proportioned to and indicative of the position of the pedal structure relative to the carrier;

a coil spring arranged to be torsionally tightened in response to a force applied to the pedal pad whereby to provide a spring resistance force opposing the pedal apply force and arranged to be torsionally relaxed in response to release of the pedal apply force whereby to provide a spring return force; and means operative in response to torsional tightening of the spring to generate a frictional resistance force that is additive with respect to the spring resistance force and subtractive with respect to the spring return force.

2. An adjustable pedal assembly according to claim 1 wherein:

the operative means includes an annular sleeve mounted on an annular friction surface; and the coil spring closely encircles the sleeve so that the torsional tightening of the spring urges the sleeve into frictional engagement with the friction surface.

3. An adjustable pedal assembly according to claim 2 wherein:

the pedal structure includes a pedal arm carrying the pedal pad at the lower end of the pedal arm and a pivot shaft at the upper end of the pedal arm mounting the pedal arm for pivotal movement on the carrier;

the carrier includes a housing defining a hub structure defining the annular friction surface;

the pivot shaft is journaled in the housing and is positioned concentrically within the hub structure;

the sleeve is positioned over the hub structure; and the coil spring winds around the sleeve with one end of the spring anchored to the pedal arm and the other end of the spring anchored to the housing.

4. An adjustable pedal assembly according to claim 3 wherein the generator means comprises a potentiometer whose setting is varied in response to pivotal movement of the pedal structure.

5. An adjustable pedal assembly according to claim 4 wherein the setting of the potentiometer is varied in response to rotary movement of the pivot shaft.

6. An adjustable pedal assembly according to claim 5 wherein:

the pivot shaft includes a first end portion at one side of the pedal arm and a second end portion at another side of the pedal arm;

the first end portion of the pivot shaft is positioned within the housing hub structure; and the second end portion of the pivot shaft comprises an input shaft for the potentiometer.

7. An adjustable pedal assembly according to claim 1 wherein:

the guide means comprises a guide rod;

the carrier includes an upper portion mounted on the guide rod for sliding fore and aft movement along the guide rod; and the pedal structure includes a pedal arm having an upper end mounted on a lower portion of the carrier.

8. An adjustable pedal assembly according to claim 7 wherein:

the pedal arm is pivotally mounted on the lower carrier portion; and the generator means includes a potentiometer mounted on the lower portion of the carrier and means operative in response to pivotal movement of the pedal arm to vary the setting of the potentiometer.

9. An adjustable pedal assembly for a motor vehicle adapted to be mounted on a body structure of the vehicle and operative to generate a control signal for controlling an associated device of the motor vehicle, said assembly comprising:

a carrier;

guide means mounting the carrier for fore and aft movement relative to the vehicle body structure;

drive means for moving the carrier along the guide means;

a pedal structure mounted on the carrier for movement relative to the carrier and including a pedal pad;

generator means operative in response to movement of the pedal structure relative to the carrier to generate an electric control signal proportioned to the extent of movement of the pedal structure relative to the carrier;

a coil spring arranged to be torsionally tightened in response to a force applied to the pedal pad whereby to provide a spring resistance force opposing the pedal apply force and arranged to be torsionally relaxed in response to release of the pedal apply force whereby to provide a spring return force; and means operative in response to torsional tightening of the spring to generate a frictional resistance force that is additive with respect to the spring resistance force and subtractive with respect to the spring return force;

the guide means comprising a hollow guide rod;

the carrier including an upper portion mounted on the guide rod for sliding fore and aft movement along the guide rod;

the pedal structure including a pedal arm having an upper end mounted on a lower portion of the carrier;

the pedal arm being pivotally mounted on the lower carrier portion;

the generator means including a potentiometer mounted on the lower portion of the carrier and means operative in response to pivotal movement of the pedal arm to vary the setting of the potentiometer;

the carrier further including a nut slidably positioned within the hollow of the guide rod and means connecting the nut to the carrier so that sliding movement of the nut within the guide rod moves the carrier fore and aft along the guide rod; and the drive means including a screw shaft threadably received in the nut and means operative to rotate the screw shaft.

10. An adjustable pedal assembly according to claim 9 wherein:

the lower portion of the carrier defines a hollow; and the potentiometer is positioned in the carrier hollow.

11. An adjustable pedal assembly according to claim 10 wherein the potentiometer includes a central shaft comprising a pivot shaft of the pedal arm.

12. An adjustable pedal assembly according to claim 11 wherein the upper end of the pedal arm is positioned in the carrier hollow in side by side relation to the potentiometer.

13. An accelerator pedal assembly for a motor vehicle adapted to be mounted on a body structure of the vehicle and operative to generate a control signal for controlling a throttle device of the motor vehicle, said assembly comprising:

a hollow guide rod;

a nut slidably positioned in the guide rod;

a carrier slidably mounted on the guide rod;

means drivingly connecting the nut to the carrier so that sliding movement of the nut within the guide rod moves the carrier slidably along the guide rod;

a screw shaft within the guide rod threadably engaging the nut;

a pedal structure including a pivot shaft mounted on the carrier, a pedal arm extending downwardly from the pivot shaft, and a pedal pad on the lower end of the pedal arm;

a potentiometer mounted on the carrier and operative in response to pivotal movement of the pivot shaft to generate an electric control signal proportioned to the extent of movement of the pedal arm relative to the carrier;

a coil spring positioned around the pivot shaft and having one end anchored to the pedal arm and another end anchored to the carrier, the spring being arranged to be torsionally tightened in response to a force applied to the pedal pad whereby to provide a spring resistance force opposing the pedal apply force and arranged to be torsionally relaxed in response to release of the pedal apply force whereby to provide a spring return force; and means operative in response to torsional tightening of the spring to generate a frictional resistance force that is additive with respect to the spring resistance force and subtractive with respect to the spring return force.

14. An accelerator pedal assembly according to claim 13 wherein:

the operative means includes an annular sleeve mounted on an annular friction surface; and the coil spring closely encircles the sleeve so that the torsional tightening of the spring urges the sleeve into frictional engagement with the annular friction surface.

15. An accelerator pedal assembly according to claim 14 wherein:

the carrier includes a housing; and the housing includes a hub structure surrounding relation to the pivot shaft and defining the annular friction surface.

* * * * *